United States Patent [19]
Tangler et al.

[11] Patent Number: 6,068,446
[45] Date of Patent: May 30, 2000

[54] AIRFOILS FOR WIND TURBINE

[75] Inventors: James L. Tangler, Boulder, Colo.; Dan M. Somers, State College, Pa.

[73] Assignee: Midwest Research Institute, Kansas City, Mo.

[21] Appl. No.: 08/975,478

[22] Filed: Nov. 20, 1997

[51] Int. Cl.$^7$ .................................................. F03B 3/12
[52] U.S. Cl. .............................. 416/223 R; 416/DIG. 2; 416/DIG. 5
[58] Field of Search .......................... 416/223 R, DIG. 2, 416/DIG. 5

[56] References Cited

U.S. PATENT DOCUMENTS

| | | |
|---|---|---|
| 3,173,490 | 3/1965 | Stuart, III . |
| 4,408,958 | 10/1983 | Schacle . |
| 4,459,083 | 7/1984 | Bingham . |
| 4,606,519 | 8/1986 | Fertis et al. . |
| 4,619,423 | 10/1986 | Holmes et al. . |
| 4,668,169 | 5/1987 | Perry . |
| 4,732,542 | 3/1988 | Hahn et al. . |
| 4,830,315 | 5/1989 | Presz, Jr. et al. . |
| 4,830,574 | 5/1989 | Wainauski et al. . |
| 4,844,698 | 7/1989 | Gornstein et al. . |
| 4,927,330 | 5/1990 | Asboth . |
| 4,941,803 | 7/1990 | Wainauski et al. . |
| 4,976,587 | 12/1990 | Johnston et al. . |
| 5,114,099 | 5/1992 | Gao . |
| 5,161,952 | 11/1992 | Eggers, Jr. . |
| 5,417,548 | 5/1995 | Tangler et al. . |
| 5,562,420 | 10/1996 | Tangler et al. . |

FOREIGN PATENT DOCUMENTS

| | | |
|---|---|---|
| 8503110 | 7/1985 | WIPO . |

OTHER PUBLICATIONS

Somers, D.L. "Subsonic Natural–Laminar–Flow Airfoils", Natural Laminar Flow and Laminar Flow Control, pp. 143–172, 1992.

"Thick Airfoils for HAWTs", Timmer, W.A.; van Rooy, R.P.J.O.M., *Journal of Wind Engineering and Industrial Aerodynamics*, 39 (1992) 151–160, Elsevier Science Publishers B.V., Amsterdam—Printed in The Netherlands.

"Wing–Section Effects on the Flight Performance of a Remotely Piloted Vehicle", Stollery,J.L.; Dyer, D.J., *Journal of Aircraft*, vol. 26, No. 10, pp. 932–938.

"Atmospheric Performance of the Special–Purpose SERI Thin–Foil Family: Final Results," J. Tangler, B. Smith, D. Jager, T. Olsen, European Wind Energy Conference, Sep. 1990.

"SERI Advanced Wind Turbine Blades," J. Tangler, B. Smith, D. Jager, National Technical Information Service, U.S. Department of Commerce, Feb. 1992.

"Fundamentals," Model Aircraft Aerodynamics, pp. 9–52, 1994.

"NREL Airfoil Families for HAWTs," J.L. Tangler and D.M. Somers, National Technical Information Service, U.S. Department of Commerce, Jan. 1995.

*Primary Examiner*—Christopher Verdier
*Attorney, Agent, or Firm*—Ken Richardson

[57] ABSTRACT

Airfoils for the tip and mid-span regions of a wind turbine blade have upper surface and lower surface shapes and contours between a leading edge and a trailing edge that minimize roughness effects of the airfoil and provide maximum lift coefficients that are largely insensitive to roughness effects. The airfoil in one embodiment is shaped and contoured to have a thickness in a range of about fourteen to seventeen percent, a Reynolds number in a range of about 1,500,000 to 2,000,000, and a maximum lift coefficient in a range of about 1.4 to 1.5. In another embodiment, the airfoil is shaped and contoured to have a thickness in a range of about fourteen percent to sixteen percent, a Reynolds number in a range of about 1,500,000 to 3,000,000, and a maximum lift coefficient in a range of about 0.7 to 1.5. Another embodiment of the airfoil is shaped and contoured to have a Reynolds in a range of about 1,500,000 to 4,000,000, and a maximum lift coefficient in a range of about 1.0 to 1.5.

20 Claims, 8 Drawing Sheets

AIRFOILS FOR WIND TURBINE

CONTRACTUAL ORIGIN OF THE INVENTION

The United States Government has rights in this invention under Contract No. DE-AC36-83CH10093 between the U.S. Department of Energy and the National Renewable Energy Laboratory, a Division of Midwest Research Institute.

BACKGROUND OF THE INVENTION

1. Field of the Invention

This invention relates to the field of wind turbines and, more specifically, to airfoils for use in the blades of such wind turbines.

2. Description of the Prior Art

Wind power has been used for ages to pump water, grind grain, and more recently to generate electricity. Such historic uses of wind power, however, have been primarily in applications where a single wind machine operated alone for the benefit of one or a small number of users. There is now more interest in developing wind powered generator systems in which electricity produced by a single wind powered generator or a group of wind powered generators can be supplied to utility power grids.

A conventional wind turbine for generating electric power typically includes two or more turbine blades or vanes connected to a central hub. The hub rotates about an axis and is connected to a shaft that drives an electric power generator. Wind turbines operate at either a constant rotational speed despite changes in wind velocity or at variable rotational speeds that are proportional to the wind velocity. Peak power at high wind speeds is usually controlled through stall regulation or through the use of variable pitch turbine blades.

The portion of the turbine blade closest to the hub is called the root of the blade, while the portion of the turbine blade farthest from the hub is called the tip of the blade. A cross-section of a turbine blade taken perpendicular to the imaginary line connecting the blade's root to the blade's tip is generally referred to as an airfoil. Theoretically, therefore, each turbine blade includes an infinite number of airfoils along the imaginary line. Typically, however, a blade's shape is defined in reference to a finite number of the airfoil shapes.

The geometric shape of an airfoil is usually expressed in tabular form in which the x, y coordinates of both the upper and lower surfaces of the airfoil at a given cross-section of the blade are measured with respect to the chord line, which is an imaginary line connecting the leading edge of the airfoil and the trailing edge of the airfoil. Both x and y coordinates are expressed as fractions of the chord length. Another important parameter of an airfoil is its thickness. The thickness of an airfoil refers to the maximum distance between the airfoil's upper surface and the airfoil's lower surface and is generally provided as a fraction of the airfoil's chord length. For example, a fourteen percent thick airfoil has a maximum thickness (i.e., a maximum distance between the airfoil's upper surface and the airfoil's lower surface) that is fourteen percent of the airfoil's chord length.

The chord length of an airfoil or cross-section of a turbine blade will typically become larger if the length of the blade increases and will typically become smaller if the length of the blade becomes smaller. Therefore, a table of coordinates for the geometry of the upper and lower surfaces of an airfoil remain valid for blades of different lengths, since the coordinates are dimensionless and are provided as percentages of the chord length of the airfoil.

Another important parameter for every airfoil or blade cross-section is its operating Reynolds number. The Reynolds number of an airfoil at a particular radial station is dimensionless and is defined by the following equation:

$$R = \frac{cV}{v} \quad (1)$$

where R is the Reynolds number, c is the chord length of the airfoil, V is the flow velocity relative to the blade at the corresponding radial point on the blade, and v is the kinematic viscosity of the air. Physically, the Reynolds number can be thought of as the ratio of the inertial force to the viscous force of air flow around a turbine blade. Viscous force is proportional to the shearing stress in the air flow divided by the rate of shearing strain, while inertial force is proportional to the product of the mass of the air flow multiplied by its acceleration.

Airfoil performance characteristics are expressed as a function of the airfoil's Reynolds number. As the length of a blade decreases, the blade's Reynolds number tends to decrease. For a particular airfoil along the blade span, a small Reynolds number indicates that viscous forces predominate while a large Reynolds number indicates that inertial forces predominate.

Conversion of wind power into electrical power is accomplished in most wind powered systems by connecting a wind-driven turbine to the shaft that drives an electric generator. In the past, conventional aircraft airfoil shapes have been used to design wind turbine blades. However, such aircraft airfoil shapes have created problems with wind turbines. For example, during clean blade conditions, when the blade has not been soiled with insects or airborne pollutants, aircraft airfoils can produce or generate excessive power in high winds, which can burn out electric generators. Another problem with using conventional aircraft airfoils for designing wind turbine blades occurs when the blades produce inadequate energy output due to the blades becoming soiled with insect accumulation and airborne pollutants. The soiling of the blades creates airfoil roughness, which adversely affects the airfoil maximum lift coefficient and the desired power output from the wind turbine. In aircraft, roughness is not a major concern, since aircraft typically fly in clean air at high altitudes and because of scheduled cleaning of the planes. Unfortunately, the blades of horizontal axis wind turbines (HAWT) typically become coated with insect accumulations and airborne contaminants. The collection of dirt and other materials on a wind turbine blade, otherwise called roughness, occurs predominantly at the leading edge of the blade. Roughness removal can be time consuming, difficult, and expensive. Furthermore, since the primary goal of a wind turbine is to covert the kinetic energy of the wind into electrical energy as inexpensively and efficiently as possible, any roughness of the rotors or blades reduces the operational efficiency of the wind turbine and diminishes its overall electric power or energy generating capabilities.

As a result of the problems described above, central to the use of airfoils in a wind turbine is the use of specially designed airfoils that govern the local airflow around the blade in a manner substantially different from conventional aircraft airfoils. While some advancements have been made in this area, as described in U.S. Pat. Nos. 5,417,548 and 5,562,420 issued to Tangler and Somers, both patents of which are specifically incorporated by reference into the present invention, further families of improved airfoils are still needed to shape and condition the local airflow around blades for more efficient operation and wind power conversion to electric power, and especially to be more insensitive to roughness effects.

SUMMARY OF THE INVENTION

Accordingly, it is a general object of the present invention to provide efficient airfoils for use in wind turbines that are less sensitive to roughness effects than conventional airfoils.

It is another object of the present invention to provide efficient airfoils for blades between ten and twenty five meters in length.

It is still another object of the present invention to provide outboard region and tip region airfoils for use in wind turbines.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, the first embodiment of the airfoil of the present invention is directed to the outboard or mid-span region for a blade having a length between ten and fifteen or even twenty-five meters, a design Reynolds number between 1,500,000 ($1.5 \times 10^6$) and 2,000,000 ($2 \times 10^6$), a maximum lift coefficient of 1.4 to 1.5, and a thickness of approximately seventeen percent (17%), where the thickness of the airfoil is defined by the maximum airfoil depth perpendicular to the chord line divided by the length of the chord line. The second embodiment of the airfoil of the present invention is directed to the tip region for a blade having a length between ten and fifteen or even twenty-five meters, a design Reynolds number between 1,500,000 ($1.5 \times 10^6$) and 2,000,000 ($2 \times 10^6$), a maximum lift coefficient of 1.4 to 1.5, and a thickness of approximately fourteen percent (14%). The third embodiment of the airfoil of the present invention is directed to the outboard or mid-span region for a blade having a length between fifteen and twenty-five meters, a design Reynolds number of approximately 4,000,000 ($4 \times 10^6$), a maximum lift coefficient of approximately 1.0, and a thickness of approximately twenty-one percent (21%). The fourth embodiment of the airfoil of the present invention is directed to the tip region for a blade having a length between fifteen and twenty-five meters, a design Reynolds number of approximately 3,000,000 ($3 \times 10^6$), a maximum lift coefficient of approximately 0.9, and a thickness of approximately sixteen percent (16%). The fifth embodiment of the airfoil of the present invention is directed to the tip region for a blade having a length between ten and fifteen meters, a design Reynolds number of approximately 2,000,000 ($2 \times 10^6$), a maximum lift coefficient of approximately 0.7, and a thickness of approximately sixteen percent (16%).

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIG. 4 is another view of the airfoil of FIG. 3, illustrating the area of laminar air flow, the area of turbulent air flow, and the transition bubble between the area of laminar air flow and the area of turbulent air flow;

DETAILED DESCRIPTION OF THE PREFERRED EMBODIMENTS

Figure 1:
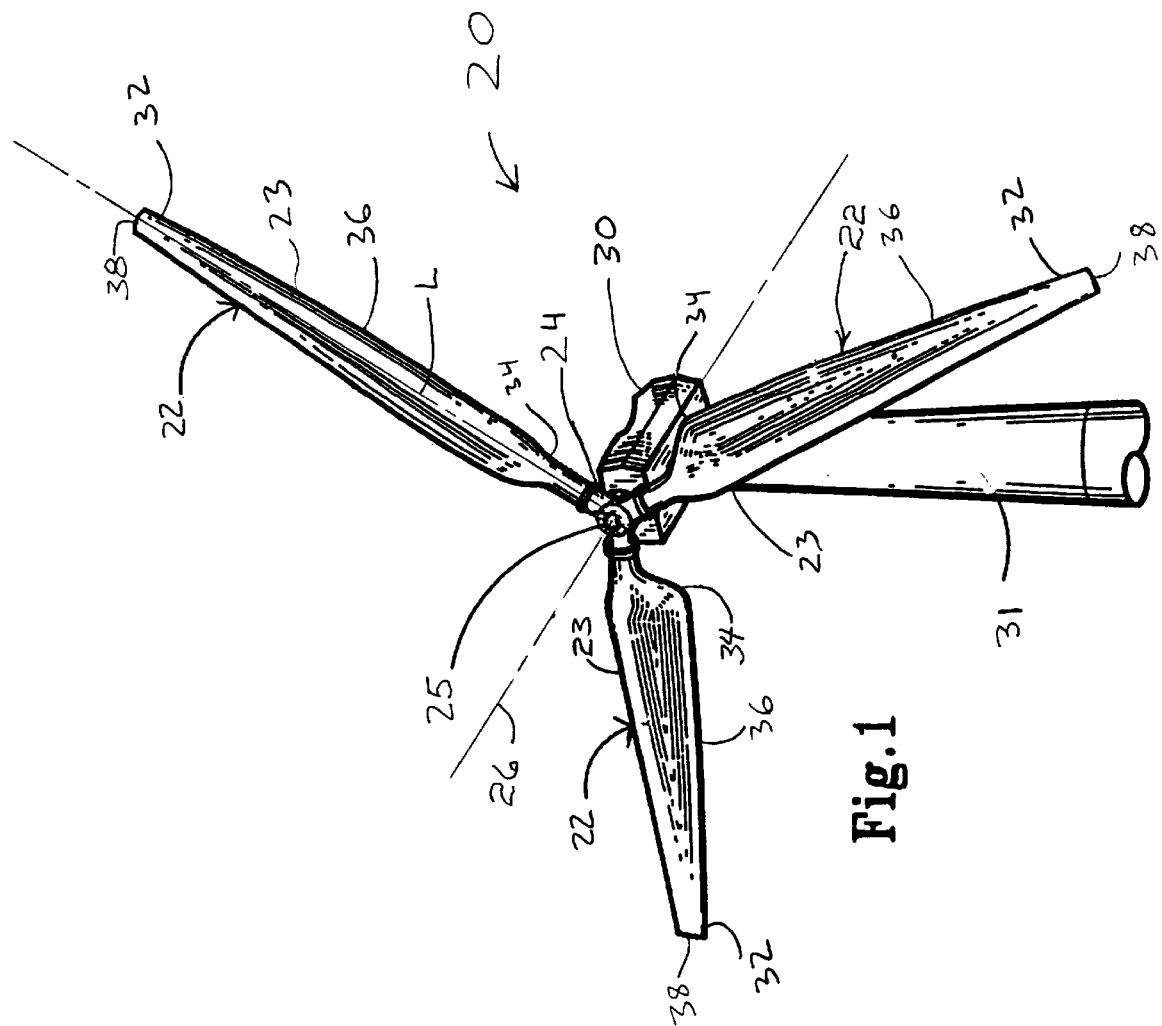
FIG. 1 is a perspective view of a horizontal axis wind turbine (HAWT) having three blades, wherein each blade can include the airfoils of the present invention.
Figure 2:
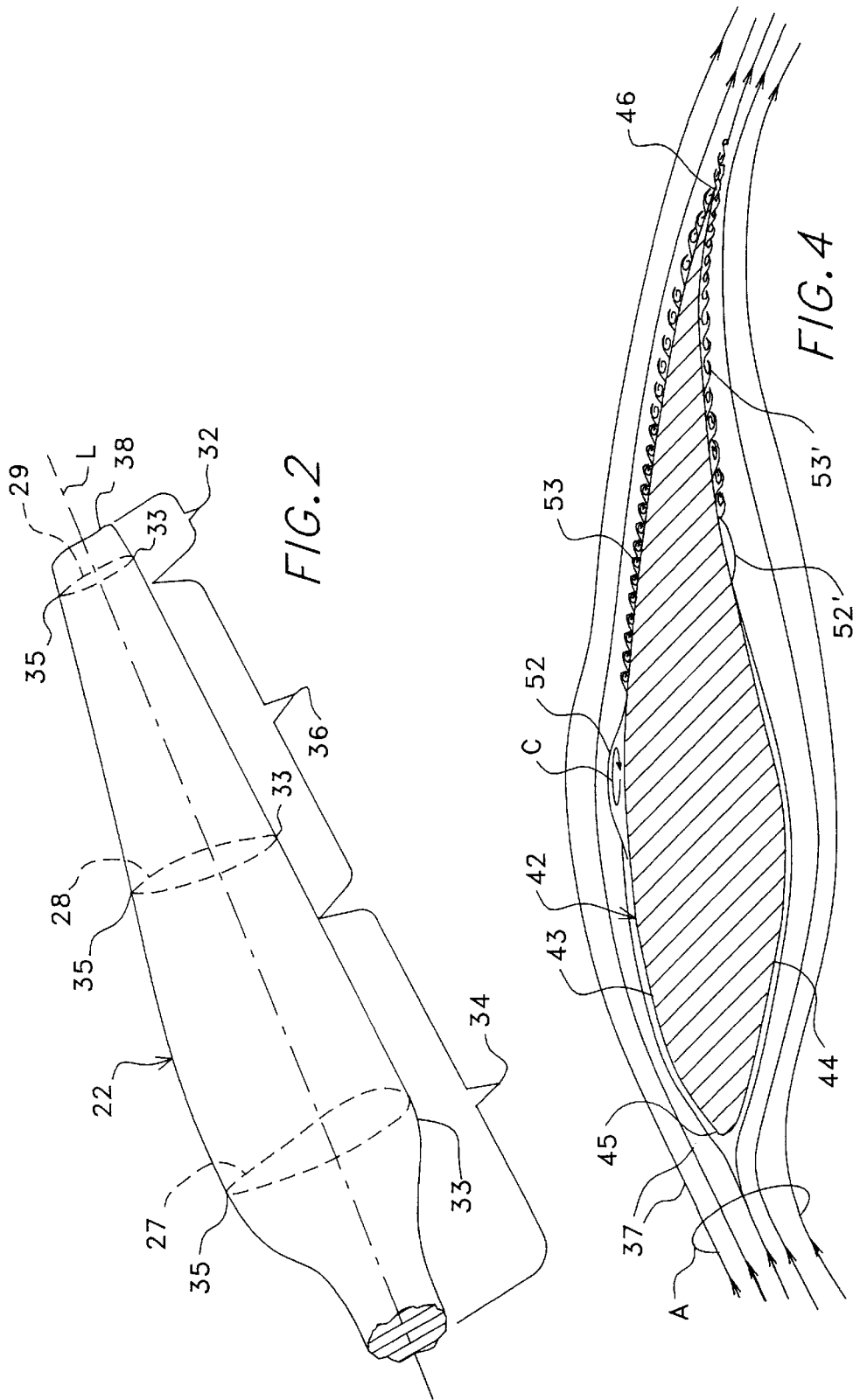
FIG. 2 is an isometric view of one of the turbine blades of FIG. 1, illustrating cross-sections or airfoils of the turbine blade by phantom lines in the root, mid-span, and tip regions of the blade.

An upwind horizontal axis wind turbine 20 (HAWT) having rotor blades 22 using the airfoils of the present invention is illustrated in FIG. 1. Each of the blades 22 of the wind turbine 20 has a leading edge 23 and is connected to a hub 24. The hub 24 is mounted on a rotatable horizontal shaft 25 that defines a horizontal axis 26 of rotation. The wind turbine 20 and shaft 25 rotate about the horizontal axis 26 of rotation when the wind striking the blades 22 is sufficiently strong. Each blade 22 includes and is defined by an infinite number of cross-sections or airfoils, including the example airfoils 27, 28, 29, wherein each airfoil is perpendicular to the imaginary line L on the blade 22 that extends radially outward from the axis 26 through the tip 38 of the blade 22, as best illustrated in FIG. 2. The shape, contour, and length of the blades 22 determine, in large part, the efficiency and power production capabilities of the wind turbine 20, as will be discussed in more detail below, and the particularly advantageous parameters of the blades 22 described below form the essence of the present invention. A significant feature of the airfoils of the present invention is that the airfoils are designed to be largely insensitive to roughness effects which are caused when the blades 22 become soiled with accumulated insects and airborne pollutants, as will also be discussed in more detail below.

The hub 24 of the wind turbine 20, as mentioned above, is typically mounted on a rotatable shaft 25, which is itself connected either directly or through a power transmission mechanism (not shown) to drive the electric generator (not shown) located in the cabin or nacelle 30. Therefore, the rotation of the blades 22, hub 24, and shaft 25 about the axis 26 cause the electric generator (not shown) located in the nacelle 30 to generate electric energy or power, which can be transmitted to a utility or power grid (not shown) or to an electric energy storage facility or device (not shown). The nacelle 30 is usually supported by a tower 31 so that the blades 22 extend into the wind and clear the ground during rotation. The general design of the hub 24, the nacelle 30, the tower 31, and the electric generator positioned within the nacelle 30 are well known to persons having ordinary skill in this art and do not constitute the subject matter of the present invention. Therefore, no further discussion of these components of the wind turbine system 20 is required for purposes of describing the airfoils of the present invention. The airfoils of the present invention, along with the airfoils described in U.S. Pat. Nos. 5,417,548 and 5,562,420, form a family of airfoils for use with wind turbine blades 22. U.S. Pat. Nos. 5,417,548 and 5,562,420 are expressly incorporated by reference into this specification.

Each blade 22 of the wind turbine 20 comprises three distinctive portions as best illustrated in FIG. 2: (i) the tip portion or region 32, which includes the portion of the blade 22 that is most distant from the axis 26; (ii) the root portion or region 34, which includes the portion of the blade 22 that is closest to the axis 26; and (iii) the outboard portion or mid-span region 36, which includes the portions of the blade 22 between the tip region 32 and the root region 34. The root region 34 of the blade 22 generally extends radially outward from the axis 26 to a point on the blade 22 that is approximately fifty percent (50%) of the distance from the axis 26 to the tip 38 of the blade 22. The outboard region 36 of a blade 22 generally extends radially outward from the root region 34 to a point on the blade 22 that is approximately ninety percent (90%) of the distance from the axis 26 to the tip 38. Finally, the tip region 32 extends radially outward from the outboard region 36 of blade 22 to the tip 38. For the previously given example airfoils 27, 28, 29, the airfoil 27 is located in the root region 34 of the blade 22, the airfoil 28 is located in the outboard or midspan region 36 of the blade 22, and the airfoil 29 is located in the tip region 32 of the blade 22. Each of the airfoils 27, 28, 29 has a leading edge 33 and a trailing edge 35. Also, as mentioned above, each airfoil has a maximum thickness that is expressed conventionally as a percent (%) of the chord 48 length, which is the straight-line distance between the leading edge 33 and the trailing edge 35. In other words, the maximum thickness is understood to be the ratio of L to C expressed as a percent, where C is the length of the chord 48 and L is the length of the longest line 48" between the upper surface 43 and the lower surface 44 that is perpendicular to the chord 48. For example, an airfoil that has a maximum thickness of 21% is one in which the length L of the longest perpendicular line 48" is 21% of the length C of the chord 48.

As discussed above, the shape, contour, and length of the airfoils of a blade 22 are determining factors in the efficiency and power production capabilities of the wind turbine 20. The shape of a blade 22 is preferably, but not necessarily, defined by a minimum of three airfoils of the blade 22, one airfoil (for example, airfoil 27) located in the root region 34 of the blade 22, one airfoil (for example, airfoil 28) located in the mid-span region 36 of the blade 22, and one airfoil (for example, airfoil 29) located in the tip region 32 of the blade 22. The shapes of the airfoils (not illustrated specifically) located between the root region 34 airfoil 27 and the mid-span region 36 airfoil 28 form preferably smooth transitions between the defining airfoils 27, 28 and can be determined by interpolation between the shapes of the two defining airfoils 27, 28, as is well known to persons having ordinary skill in this art. Similarly, the shapes of the airfoils (not illustrated specifically) located between the mid-span region 36 airfoil 28 and the tip-region 32 airfoil 29 form preferably smooth transitions between the defining airfoils 28, 29 and can be determined by an interpolation between the shapes of the two defining airfoils 28, 29.

Figure 3:
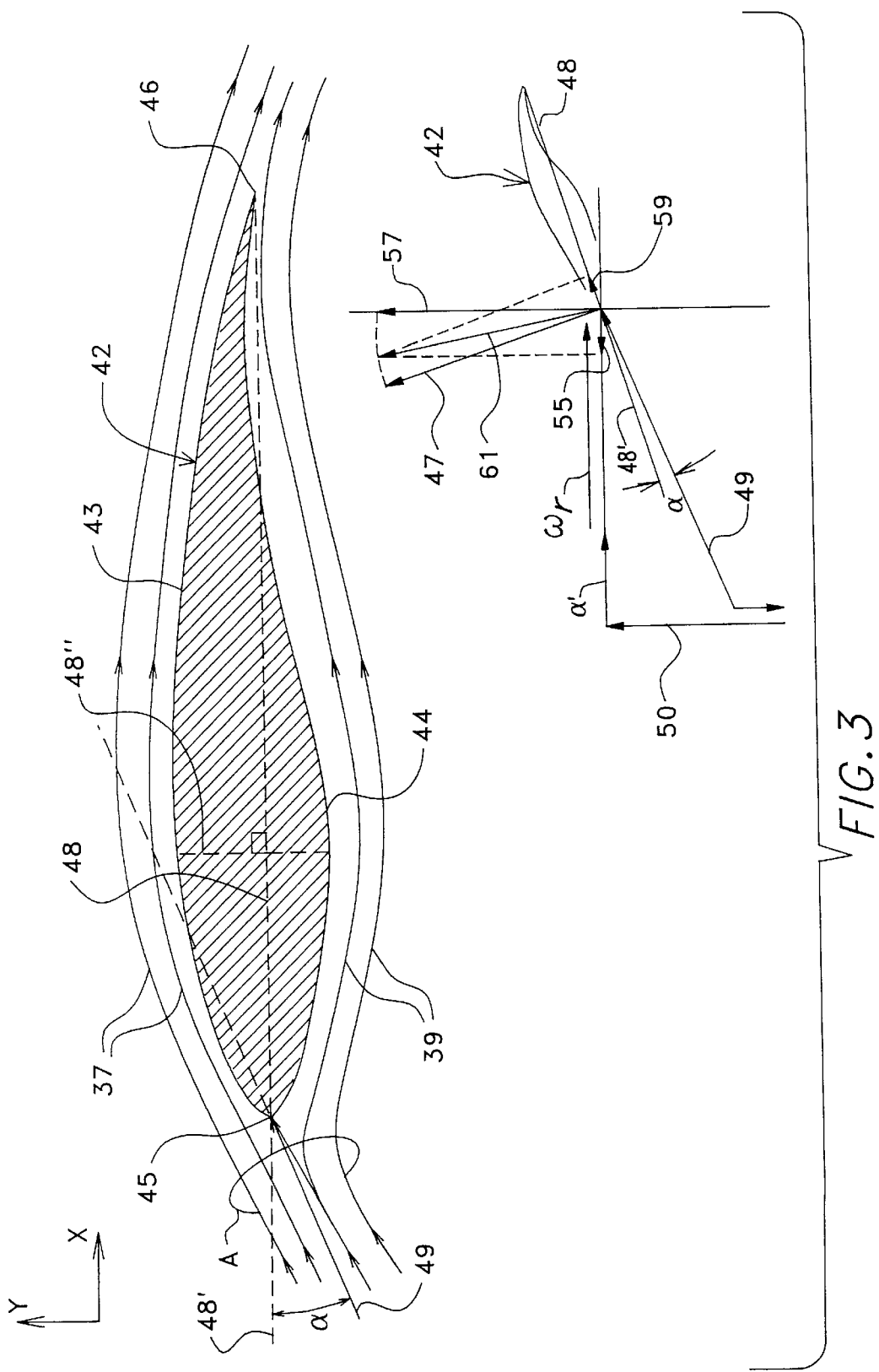
FIG. 3 is a cross-sectional view of a turbine blade to show the airfoil and to illustrate the flow of air along the upper and lower surfaces of the airfoil.

An important characteristic of any conventional wind turbine blade is its ability to create lift, which imparts force components to the blades 22 that cause the blades 22 of a wind turbine to rotate about the axis 26. Since a wind turbine blade is comprised of, and defined by, its multiple airfoils, the concept of lift of a turbine blade can, in general, be discussed by reference to one of the blade's airfoils, recognizing that lift at any particular airfoil in the blade depends on the particular geometric characteristics of such airfoil and that the lift of the entire blade is an integration of the lifts of all the airfoils in the blade. Referring, therefore, to FIG. 3, when a flowing stream of air A encounters the leading edge 45 of an example airfoil 42 of a turbine blade 22, part 37 of the air flow A passes above the airfoil 42 and flows along the upper surface or suction side 43 of the airfoil 42, while part 39 of the air flow A passes below the airfoil 42 and flows along the lower surface or pressure side 44 of the airfoil 42. The upper part 37 of air flow A and the lower part 39 of airflow A recombine at the trailing edge 46 of the airfoil 42. The air 37 flowing along the upper surface 43 of the airfoil 42 will travel at a higher average velocity than the air 39 flowing along the lower surface 44 of the airfoil 42, thereby causing a lower pressure on the upper surface 43 of the airfoil 42 than the pressure on the lower surface 44 of the airfoil 42 according to Bernoulli's Principle. The difference in pressure against the upper surface 43 and the lower surface 44 of the airfoil 42 creates a lift force, as indicated by the vector 47 in the force vector diagram in FIG. 3, which has both a torque component 55 and a thrust component 57, as will be discussed in more detail below. The lift force components acting on blades 22 in a wind turbine 20 cause the blades 22, the hub 24, and the shaft 25 to rotate about the axis 26.

The magnitude of an airfoil's lift is dependent on many factors, including the velocity of the air flow A incident on the airfoil, the shape and contour of the airfoil, and the airfoil's angle of attack. The angle of attack of an airfoil varies and is defined as the angle between the imaginary straight line or chord line extending from the airfoil's leading edge to the airfoil's trailing edge and a specific vector. The vector is the resultant vector created as a combination of the airfoil's rotational speed vector, wind speed vector, and blade induced velocity vectors. For example, for the airfoil 42 shown in FIG. 3, the angle of attack a is the angle between a straight-line extension 48' of the chord line 48 and the resultant flow vector 49.

The resultant flow vector 49 is indicative of the speed and direction of the air flow A in the x-y plane at the leading edge 45 of the airfoil 42 and is a result of the combination of: (i) the rotational speed vector $\omega_r$, which is indicative of the rotational speed of the blade 22 that contains the airfoil 42; (ii) the swirl vector a, which is induced by the wake of the turbine 20 and is in the same direction as the rotational speed vector $\omega_r$; (iii) the wind speed vector 50; and (iv) the blade induced velocity vector 51, which is in a direction opposite the wind speed vector 50 and is also induced by the wake of the turbine 20 containing the airfoil 42. For any given blade 22, an airfoil 29 in the tip region 32 of the blade 22 will have a higher rotational speed than an airfoil 27 in the root region 34 or in the midspan region 36 of the same blade 22. Likewise, an airfoil 28 in the midspan region 36 of a blade 22 will have a higher rotational speed than an airfoil in the root region 34 of the same blade 22.

In a stall regulated wind turbine, the angular speed of the wind turbine is held constant, despite an increase or decrease in wind speed so that concomitantly, the rotational velocity of a particular airfoil 35 also remains constant. As a result, the angle of attack a for airfoils 42 in a stall regulated wind turbine increases automatically as the wind speed and the resulting flow vector 49 increase in magnitude. In a variable speed wind turbine, the angular velocity of the wind turbine increases proportionately to the wind speed increases so that the rotational speed of an airfoil 42 in the rotating blade 22 also increases in proportion to wind speed increases. Therefore, the resulting flow vector 49 increases such that the angle of attack a for airfoils in the variable speed wind turbine remains constant, despite changes in wind speed. The lift force vector 47 is perpendicular to the resultant flow vector 49 and contains a torque component 55 and a thrust component 57. The torque component 55 is the most important of these components, since the torque component 55 is the primary contributor to the generation of power by the wind turbine 20. A drag vector 59 may reduce the torque component 55 of the lift force vector 47 and create the net force vector 61. In addition, the drag vector 59 may add to the thrust component 57 of the lift force vector 47, depending on the orientation of the airfoil 42.

The lift coefficient of an airfoil is a convention adopted to allow all of the factors of an airfoil's shape to be summed up in a single non-dimensional figure. A lift coefficient of 1.5 indicates more lifting effect of an airfoil than a lift coefficient of 1.0. A lift coefficient of zero (0) indicates no lifting effect at all. Lift coefficient does not have any dimensions, since it is a dimensionless number used for comparison purposes. An airfoil's lift coefficient is proportional to the airfoil's angle of attack up to the point of stall of the airfoil.

As previously mentioned above, a significant feature of the airfoils 42 of the present invention is that they are designed to be largely insensitive to roughness effects, which are caused when the blades 22 become soiled with accumulated insects, airborne pollutants, and other particles that impact and stick to the blade 22. Roughness on an airfoil reduces the maximum lift coefficient of the airfoil and, as a result, the amount of electric power or energy produced by the wind turbine system 20. More specifically, a general performance characteristic for each of the airfoils 42 of the present invention is that it exhibits a maximum lift coefficient ($C_{1,max}$) that is relatively insensitive to roughness effects.

The ability of the airfoils 42 of the present invention to have a maximum lift coefficient that is largely insensitive to roughness effects is accomplished through geometric tailoring of the airfoil shapes to force a transition from laminar flow to turbulent flow on the upper surfaces of the airfoils 42 as the maximum lift coefficient is approached and, more specifically, by ensuring that the transitions from laminar flow to turbulent flow on the upper surfaces of the airfoils 42 occurs very near the leading edge 45 of the airfoil 42 just prior to the airfoil 42 reaching its maximum lift coefficient, as will now be discussed in more detail.

The flow of air around an airfoil is either laminar, turbulent, or separated. Whether laminar flow of air or turbulent flow of air occurs at a given point on an airfoil depends on, among other things, the airfoil's shape, the airfoil's angle of attack, the airfoil's surface roughness, the speed of the air flow along the surfaces of the airfoil, and the density and viscosity of the air. In laminar flow of air along surfaces of an airfoil, the air moves in a very smooth fashion, creating layers of air sliding past the airfoil's surfaces. The lowest air lamina or layer is directly on the surface of the airfoil and is not moving at all. The second air lamina or layer is above the lowest lamina and slides smoothly over the immobile and lowest air lamina. The third air lamina or layer is above the second air lamina and slides smoothly over the second air lamina, and the next lamina above it flows smoothly over the third air lamina. The distinct sheets or laminas continue until an outermost lamina is reached which is moving at almost the speed of the external flow. The laminar layers nearest the airfoil's surfaces move slowly in comparison to the laminar layers farthest away from the airfoil's surfaces. The smooth movement of the laminar layers nearest the airfoil's surfaces reduces friction effects on the airfoil's surfaces. In addition, there is little, if any, movement of air across or from one laminar layer to another.

In a turbulent flow of air along an airfoil, there is not a tidy system of sliding layers as is typical in laminar flow. Rather, air particles move with a great amount of freedom, both up and down as well as in the general direction of the air flow from the leading edge 45 of the airfoil 42 to the trailing edge 46 of the airfoil 42. A turbulent flow of air along an airfoil can undesirably increase the friction effects on the airfoil's surfaces, thereby reducing the lift coefficient for the airfoil and increasing the airfoil's drag.

For many conventional airfoils, the flow of air along the airfoil's upper surface is laminar near the leading edge of the airfoil and turbulent near the trailing edge of the airfoil. Referring now to FIG. 4, the air flow A for the example airfoil 42 is laminar along the upper surface 43 near the leading edge 45 and turbulent along the upper surface 43 near the trailing edge 46. The transition from laminar flow to turbulent flow occurs through a separation bubble 52, which lies along the upper surface 43 of the airfoil 42 with the turbulent flow 53 extending from the transition bubble 52 to the trailing edge 46 of the airfoil 42. The transition bubble 52 is an area of circulating, air (as indicated by the arrow C) on the upper surface 43 of the airfoil 42.

Most conventional airfoils operate with the position of the transition bubble on the upper surface of the airfoil well aft of the leading edge of the airfoil at all angles of attack. Therefore, the air flow 37 along the upper surface 43 of the airfoil between the leading edge 45 of the airfoil and the transition bubble 52 is intended to be primarily laminar. Roughness on the upper surface 43 of the airfoil will result in the transition from laminar to turbulent flow to move closer to the leading edge 45, thereby reducing the lift coefficient of the airfoil. The airfoils may also contain a separation bubble located on the lower surface of the airfoil such as, for example, the separation bubble 52' located on the lower surface 44 of the airfoil 42 which creates turbulent flow 53' on the lower surface 44 of the airfoil 42. Separation bubbles on the lower surface of an airfoil are not generally significant with regard to the airfoil's roughness sensitivity, since usually about two-thirds of an airfoil's lift comes from the suction side or upper surface side of the airfoil.

As previously discussed above, the lift coefficient for an airfoil increases as its angle of attack increases. Therefore, for most conventional airfoils, as the airfoil's angle of attack increases, the airfoil's lift coefficient increases and approaches the airfoil's maximum lift coefficient. Since roughness on the airfoil's upper surface will cause turbulent air flow along the upper surface of the airfoil, an airfoil that normally has laminar flow in this upper surface region may suffer from turbulent air flow in this upper surface region created by the surface roughness. The turbulent air flow will decrease the airfoil's lift coefficient, thereby making the maximum lift coefficient of the airfoil sensitive to roughness on the airfoil's upper surface.

Figure 5:
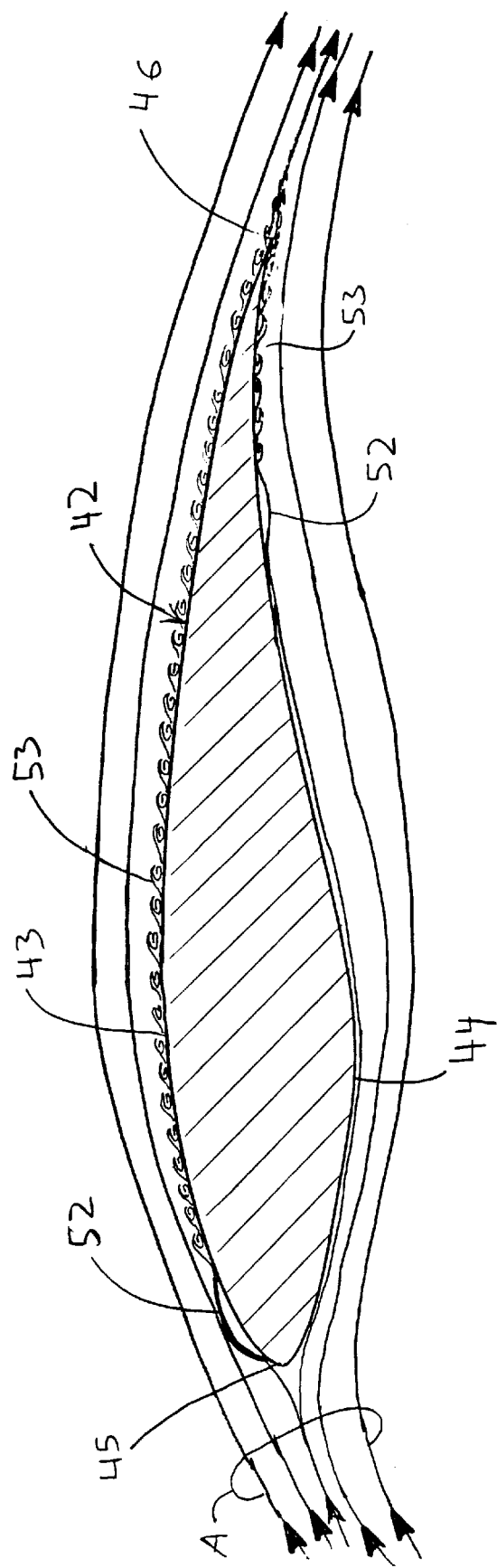
FIG. 5 is similar to FIG. 4 and is another view of the airfoil of FIG. 3, illustrating the transition bubble between the area of laminar flow and the area of turbulent flow being positioned closer to the leading edge of the airfoil than is shown in FIG. 4.

The airfoils of the present invention are designed so that the transition bubble 52 located on the upper surface 43 of the airfoil moves toward the leading edge of the airfoil just prior to the airfoil obtaining its maximum lift coefficient as the airfoil's angle of attack increases, thereby minimizing the effects of roughness on the maximum lift coefficient of the airfoil. The movement and change in size of the transition bubble 52 along the top surface of the airfoil toward the leading edge of the airfoil is a result of changes in pressure distributed along the top surface of the airfoil. In the example airfoil 42 illustrated in FIG. 4, the transition bubble 52 positioned on the upper surface 43 will move rapidly toward the leading edge 45 of the airfoil 42 as the airfoil's 42 maximum lift coefficient is approached (see FIG. 5). Therefore, there is no laminar flow of air along the top surface 43 of the airfoil 42 just prior to the airfoil 42 reaching its maximum lift coefficient. As a result, a maximum lift coefficient for the airfoil 42 is obtained that is relatively insensitive to roughness effects when compared to conventional airfoils. Since the flow of air along the upper surface 43 of the airfoil 42 at high angles of attack is already turbulent due to the shifting of the position of the transition bubble 50 on the upper surface 43 of the airfoil 42, roughness on the upper surface 43 of the airfoil 42 cannot increase the turbulence of the airflow along the upper surface 43 of the airfoil 42 significantly. The separation bubble 52' located on the lower surface 44 of the airfoil 42 may move slightly aft toward the trailing edge 46 of the airfoil 42, as previously discussed above, but the movement of the separation bubble 52' does not significantly effect the roughness sensitivity of the airfoil 42.The blades 22 of the present invention can be made of fiberglass, wood, a suitable composite material or any other material that can withstand the forces and environmental conditions encountered.

EXAMPLE I

Figure 6:
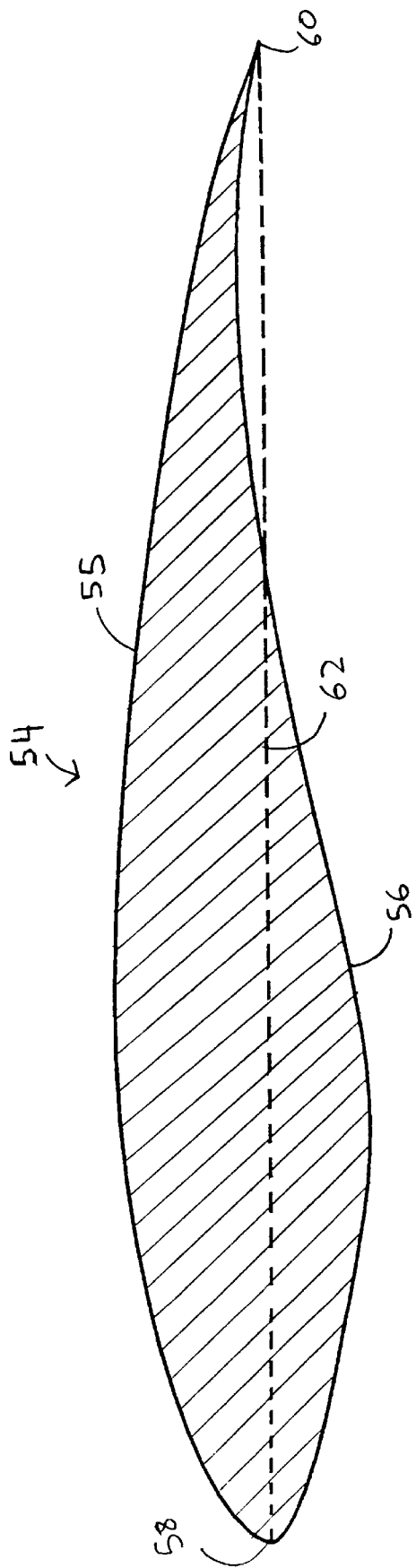
FIG. 6 is a cross-sectional view of an outboard or mid-span region showing an airfoil that can be used in the horizontal axis wind turbine blades of FIG. 1.

A first example airfoil 54 designed in accordance with this invention is illustrated in FIG. 6 and comprises an example of an airfoil 28 in the mid-span region 36 of a blade 22, as was illustrated in FIG. 2. More specifically, the airfoil 54 illustrated in FIG. 6 is located preferably on a blade 22 at a distance away from the axis of rotation 26 that is approximately seventy-five percent (75%) of the length of the blade 22. The airfoil 54 has specific geometric tailoring to achieve a maximum lift coefficient in a range between 1.4 to 1.5 for a design Reynolds number in a range between 1,500,000 and 2,000,000. The example airfoil 54 includes the upper surface 55 and the lower surface 56 extending between the leading edge 58 and the trailing edge 60. The chord line 62 is formed between the leading edge 58 and the trailing edge 60. The airfoil 54 is designed for the outboard or mid-span region 36 of blades between ten and fifteen meters in length. The airfoil 54 also has a maximum thickness of approximately seventeen percent (17%) of the length of the chord 62. Furthermore, while the airfoil 54 is designed for use primarily with a variable pitch or variable speed wind turbine, the airfoil 54 can also be used with fixed pitch, stall-regulated, wind turbines.

The specific example shape or contour of the airfoil 54 according to this invention is given in Table 1 below in the form of dimensionless coordinates x/c and y/c, so that they define the airfoil shape and contour, regardless of whatever the overall size or chord length c of the airfoil may be. The dimensionless x/c values are ratios of respective distances x between the leading edge 58 and respective reference points on the chord line 62 to the length c of the chord 62. The dimensionless y/c values are ratios of respective heights y from the chord line 62 to respective points either on the upper surface 55 or the lower surface 56 of the airfoil 54. In one part of Table 1, corresponding y/c coordinate values are given for respective x/c coordinate values to define the shape and contours of the upper surface 55 in relation to the chord line 62. Likewise, in another part of Table 1, corresponding y/c coordinate values are given for respective x/c coordinate values to define the shape and contours of the lower surface 56 in relation to the chord line 62. Therefore, for any particular desired chord length c that may be chosen for an airfoil 54 with this shape and contour, the respective x and y coordinates for the upper surface 55 and for the lower surface 56 can be determined from the values in Table 1 to produce the airfoil 54 with this shape and contour, as will be understood by persons skilled in the art. Note that due to the high curvature or camber of the airfoil 54, the chord line 62 falls partially outside the airfoil 54. Therefore, some of the y/c coordinates for the lower surface in Table 1 are negative for the portion of the lower surface 56 of the airfoil 54 that is below the chord line 62, while others of the y/c coordinates for the lower surface in Table 1 are positive for the portion of the lower surface 56 of the airfoil 54 that is above the chord line 62.

TABLE 1

| Upper Surface | | Lower Surface | |
|---|---|---|---|
| x/c | y/c | x/c | y/c |
| 0.00001 | 0.00030 | 0.00014 | −0.00143 |
| 0.00028 | 0.00224 | 0.00081 | −0.00307 |
| 0.00129 | 0.00543 | 0.00197 | −0.00477 |
| 0.00721 | 0.01481 | 0.00650 | −0.00920 |
| 0.01766 | 0.02500 | 0.01819 | −0.01650 |
| 0.03250 | 0.03549 | 0.03502 | −0.02381 |
| 0.05161 | 0.04596 | 0.05670 | −0.03093 |
| 0.07479 | 0.05616 | 0.08297 | −0.03780 |
| 0.10185 | 0.06588 | 0.11351 | −0.04443 |
| 0.13251 | 0.07494 | 0.14790 | −0.05114 |
| 0.16643 | 0.08315 | 0.18480 | −0.05834 |
| 0.20324 | 0.09032 | 0.22231 | −0.06499 |
| 0.24253 | 0.09625 | 0.25997 | −0.06891 |
| 0.28387 | 0.10060 | 0.29879 | −0.06869 |
| 0.32709 | 0.10296 | 0.34011 | −0.06415 |
| 0.37230 | 0.10329 | 0.38475 | −0.05600 |
| 0.41930 | 0.10195 | 0.43307 | −0.04520 |
| 0.46763 | 0.09920 | 0.48499 | −0.03306 |
| 0.51676 | 0.09525 | 0.53974 | −0.02082 |
| 0.56616 | 0.09029 | 0.59631 | −0.00935 |
| 0.61526 | 0.08450 | 0.65355 | 0.00060 |
| 0.66350 | 0.07806 | 0.71026 | 0.00854 |
| 0.71028 | 0.07112 | 0.76514 | 0.01410 |
| 0.75503 | 0.06385 | 0.81692 | 0.01713 |
| 0.79720 | 0.05636 | 0.86437 | 0.01757 |
| 0.83624 | 0.04878 | 0.90608 | 0.01553 |
| 0.87165 | 0.04117 | 0.94062 | 0.01168 |
| 0.90294 | 0.03351 | 0.96717 | 0.00727 |
| 0.92994 | 0.02560 | 0.98566 | 0.00342 |
| 0.95294 | 0.01758 | 0.99646 | 0.00088 |
| 0.97208 | 0.01022 | 1.00000 | 0.00000 |
| 0.98695 | 0.00450 | | |
| 0.99661 | 0.00108 | | |
| 1.00000 | 0.00000 | | |

EXAMPLE II

Figure 7:
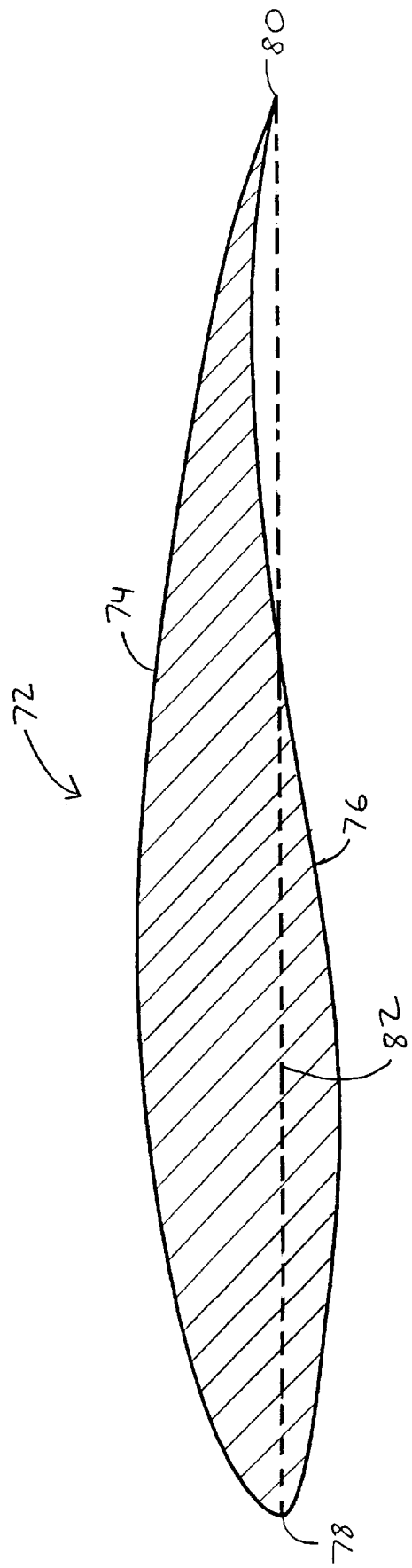
FIG. 7 is a cross-sectional view of a tip region showing an airfoil that can be used in the horizontal axis wind turbine blades of FIG. 1.

A second example airfoil 72 designed in accordance with this invention is illustrated in FIG. 7, which shows an airfoil for the tip region 32 of blade 22. More specifically, the airfoil 72 illustrated in FIG. 7 is located preferably on a blade 22 at a distance away from the axis of rotation 26 that is approximately ninety-five percent (95%) of the length of the blade 22. The airfoil 72 has specific geometric tailoring to achieve a maximum lift coefficient in a range between 1.4 to 1.5 for a Reynolds number in a range between 1,500,000 and 2,000,000. The airfoil 72 includes the upper surface 74 and the lower surface 76 with the leading edge 78 and the trailing edge 80. The chord line 82 is formed between the leading edge 78 and the trailing edge 80. The airfoil 72 is designed for the tip region 32 of blades between ten and fifteen meters in length. The airfoil 72 also has a maximum thickness of approximately fourteen percent (14%) of the length of the chord 82. Furthermore, while the airfoil 72 is designed for use primarily with a variable pitch or variable speed wind turbine, the airfoil 72 can also be used with fixed pitch, stall-regulated, wind turbines.

The specific shape or contour of the airfoil 72 is given in Table 2 in the form of dimensionless coordinates in the same manner as explained above for Example I. Briefly, the x/c values represent locations on the chord line 82 in relation to the leading edge 78. The y/c values represent heights from the chord line 82 to points either on the upper surface 74 or the lower surface 76 of the airfoil 72. The x/c and y/c values are given for both the upper surface 74 and the lower surface 76 of the airfoil 72 in Table 2 in a similar manner as explained above for Table I in Example I.

TABLE 2

| Upper Surface | | Lower Surface | |
| --- | --- | --- | --- |
| x/c | y/c | x/c | y/c |
| 0.00018 | 0.00159 | 0.00000 | −0.00005 |
| 0.00255 | 0.00748 | 0.00021 | −0.00146 |
| 0.00954 | 0.01638 | 0.00093 | −0.00274 |
| 0.02088 | 0.02596 | 0.00216 | −0.00403 |
| 0.03651 | 0.03580 | 0.00367 | −0.00525 |
| 0.05636 | 0.04562 | 0.01367 | −0.01035 |
| 0.08026 | 0.05519 | 0.02920 | −0.01518 |
| 0.10801 | 0.06434 | 0.04998 | −0.01960 |
| 0.13934 | 0.07288 | 0.07580 | −0.02362 |
| 0.17395 | 0.08068 | 0.10637 | −0.02729 |
| 0.21146 | 0.08758 | 0.14133 | −0.03091 |
| 0.25149 | 0.09343 | 0.17965 | −0.03486 |
| 0.29361 | 0.09807 | 0.21987 | −0.03855 |
| 0.33736 | 0.10133 | 0.26153 | −0.04064 |
| 0.38228 | 0.10294 | 0.30497 | −0.04051 |
| 0.42820 | 0.10249 | 0.35027 | −0.03794 |
| 0.47526 | 0.10005 | 0.39779 | −0.03280 |
| 0.52324 | 0.09607 | 0.44785 | −0.02563 |
| 0.57161 | 0.09094 | 0.50032 | −0.01720 |
| 0.61980 | 0.08489 | 0.55484 | −0.00841 |
| 0.66724 | 0.07816 | 0.61055 | −0.00015 |
| 0.71333 | 0.07095 | 0.66644 | 0.00699 |
| 0.75749 | 0.06341 | 0.72142 | 0.01254 |
| 0.79915 | 0.05572 | 0.77434 | 0.01621 |
| 0.83778 | 0.04798 | 0.82409 | 0.01784 |
| 0.87287 | 0.04029 | 0.86953 | 0.01741 |
| 0.90391 | 0.03262 | 0.90945 | 0.01498 |
| 0.93072 | 0.02479 | 0.94257 | 0.01113 |
| 0.95355 | 0.01695 | 0.96813 | 0.00689 |
| 0.97251 | 0.00982 | 0.98604 | 0.00324 |
| 0.98719 | 0.00431 | 0.99655 | 0.00084 |
| 0.99668 | 0.00103 | 1.00000 | 0.00000 |
| 1.00000 | 0.00000 | | |

EXAMPLE III

Figure 8:
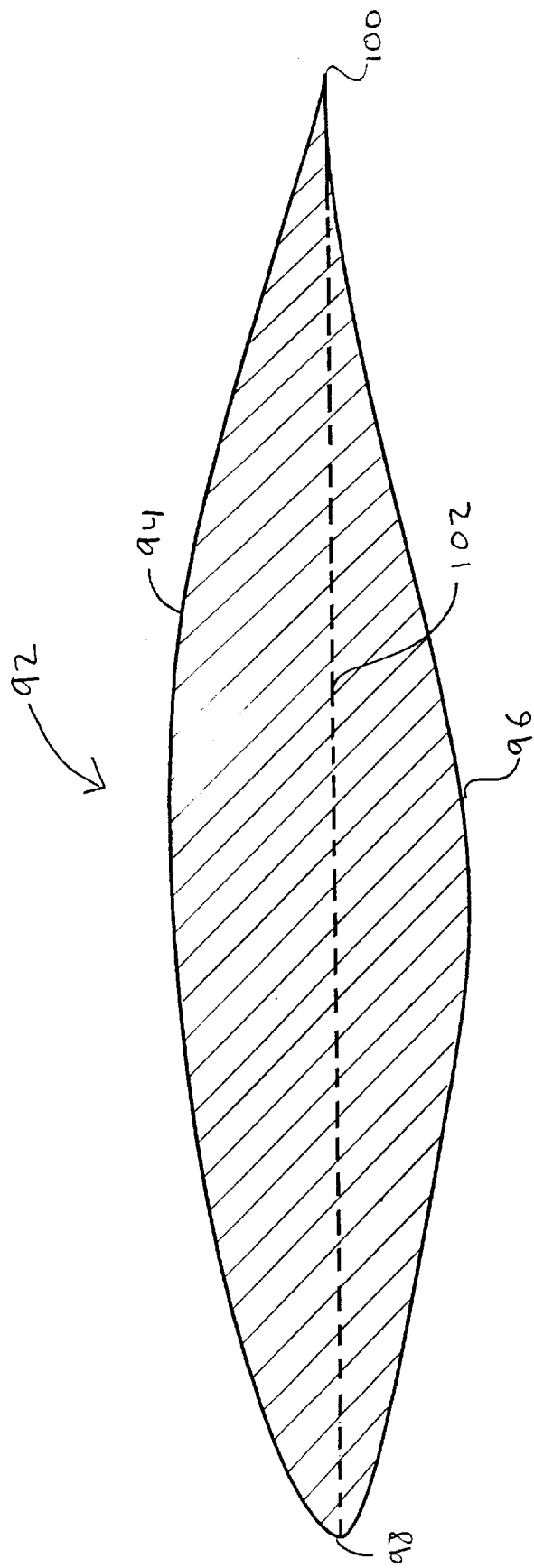
FIG. 8 is a cross-sectional view of an outboard or mid-span region showing another airfoil that can be used in the horizontal axis wind turbine blades of FIG. 1.

A third example airfoil 92 designed in accordance with this invention is illustrated in FIG. 8, which shows an airfoil for the mid-span region 36 of a turbine blade 22. More specifically, the airfoil 92 illustrated in FIG. 8 is located preferably on a blade 22 at a distance away from the axis of rotation 26 that is approximately seventy-five percent (75%) of the length of the blade 22. The airfoil 92 has specific geometric tailoring to achieve a maximum lift coefficient of approximately 1.0 for a Reynolds number of approximately 4,000,000. The airfoil 92 includes the upper surface 94 and the lower surface 96 with the leading edge 98 and the trailing edge 100. The chord line 102 is formed between the leading edge 98 and the trailing edge 100. The airfoil 92 is designed for the outboard region 36 of blades between fifteen and twenty-five meters in length. The airfoil 92 also has a maximum thickness of approximately twenty-one percent (21%) for the length of the chord 102. Furthermore, while the airfoil 92 is designed for use primarily with a fixed pitch, stall-regulated, wind turbine, the airfoil 92 can also be used with variable pitch or variable speed wind turbines.

The specific shape or contour of the airfoil 92 is given in Table 3 in the form of dimensionless coordinates in the same manner as explained above for Example I. Briefly, the x/c values represent locations on the length of chord line 102 in relation to the leading edge 98. The y/c values represent heights from the chord line 102 to points either on the upper surface 94 or the lower surface 96 of the airfoil 92. The x/c and y/c values are given for both the upper surface 94 and the lower surface 96 of the airfoil 92 in Table 3 in a similar manner as explained above for Table I in Example I.

TABLE 3

| Upper Surface | | Lower Surface | |
| --- | --- | --- | --- |
| x/c | y/c | x/c | y/c |
| 0.00003 | 0.00054 | 0.00010 | −0.00098 |
| 0.00040 | 0.00228 | 0.00075 | −0.00240 |
| 0.00327 | 0.00789 | 0.00194 | −0.00390 |
| 0.01168 | 0.01688 | 0.00388 | −0.00572 |
| 0.02501 | 0.02661 | 0.01440 | −0.01227 |
| 0.04304 | 0.03671 | 0.03068 | −0.01907 |
| 0.06557 | 0.04692 | 0.05249 | −0.02597 |
| 0.09234 | 0.05703 | 0.07952 | −0.03303 |
| 0.12305 | 0.06686 | 0.11138 | −0.04031 |
| 0.15735 | 0.07623 | 0.14752 | −0.04794 |
| 0.19486 | 0.08497 | 0.18727 | −0.05596 |
| 0.23516 | 0.09293 | 0.22978 | −0.06438 |
| 0.27779 | 0.09996 | 0.27409 | −0.07310 |
| 0.32229 | 0.10593 | 0.31892 | −0.08183 |
| 0.36815 | 0.11068 | 0.36288 | −0.08933 |
| 0.41487 | 0.11409 | 0.40597 | −0.09376 |
| 0.46193 | 0.11603 | 0.44906 | −0.09443 |
| 0.50881 | 0.11636 | 0.49274 | −0.09126 |
| 0.55498 | 0.11490 | 0.53770 | −0.08456 |
| 0.59988 | 0.11131 | 0.58417 | −0.07538 |
| 0.64347 | 0.10497 | 0.63172 | −0.06463 |
| 0.68639 | 0.09591 | 0.67984 | −0.05305 |
| 0.72880 | 0.08503 | 0.72787 | −0.04136 |
| 0.77025 | 0.07315 | 0.77506 | −0.03025 |
| 0.81021 | 0.06086 | 0.82049 | 0.02035 |
| 0.84805 | 0.04872 | 0.86316 | −0.01216 |
| 0.88305 | 0.03718 | 0.90192 | −0.00603 |
| 0.91460 | 0.02643 | 0.93560 | −0.00204 |
| 0.94236 | 0.01682 | 0.96306 | −0.00001 |
| 0.96586 | 0.00900 | 0.98337 | 0.00052 |
| 0.98413 | 0.00360 | 0.99581 | 0.00025 |
| 0.99591 | 0.00078 | 1.00000 | 0.00000 |
| 1.00000 | 0.00000 | | |

EXAMPLE IV

Figure 9:
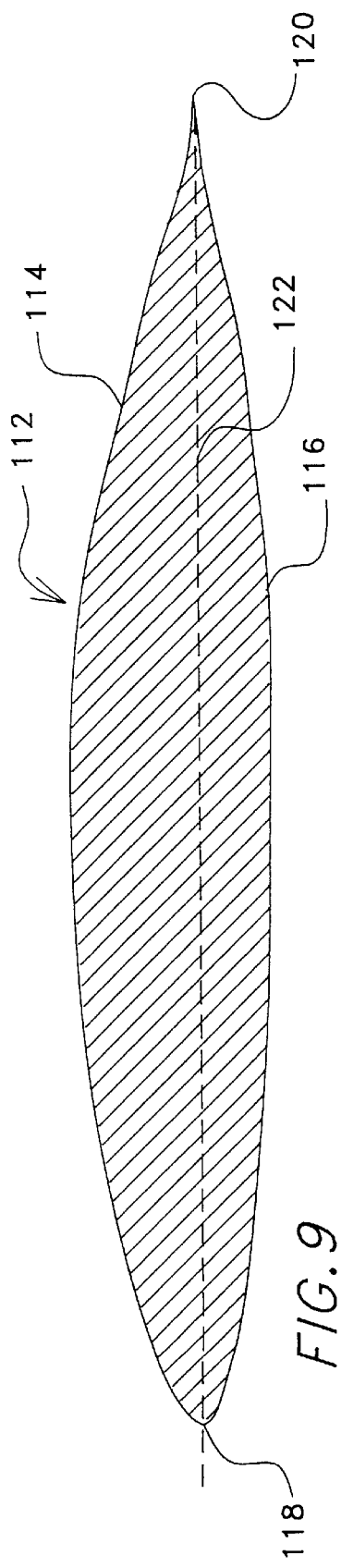
FIG. 9 is a cross-sectional view of a tip region showing another airfoil that can be used in the horizontal axis wind turbine blades of FIG. 1.

A fourth example airfoil 112 designed in accordance with this invention is illustrated in FIG. 9, which shows an airfoil for the tip region 32 of a blade 22. More specifically, the airfoil 112 illustrated in FIG. 9 is located preferably on a blade 22 at a distance away from the axis of rotation 26 that is approximately ninety-five percent (95%) of the length of the blade 22. The airfoil 112 has specific geometric tailoring to achieve a maximum lift coefficient of approximately 0.9 for a Reynolds number of approximately 3,000,000. The airfoil 112 includes the upper surface 114 and the lower surface 116 with the leading edge 118 and the trailing edge 120. The chord line 122 is formed between the leading edge 118 and the trailing edge 120. The airfoil 112 is designed for the tip region 32 of blades between fifteen and twenty-five meters in length. The airfoil 112 also has a maximum thickness of approximately sixteen percent (16%) of the length of chord 122. Furthermore, while the airfoil 112 is designed for use primarily with a fixed pitch, stall-regulated, wind turbine, the airfoil 112 can also be used with variable pitch or variable speed wind turbines.

The specific shape or contour of the airfoil 112 is given in Table 4 in the form of dimensionless coordinates in the same manner as explained above for Example I. Briefly, the x/c values represent locations on the length c of the chord line 122 as in relation to the leading edge 118. The y/c values represent heights from the chord line 122 to points either on the upper surface 114 or the lower surface 116 of airfoil 112. The x/c and y/c values are given for both the upper surface 114 and the lower surface 116 of the airfoil 112 in Table 4 in a similar manner as explained above for Table I in Example I.

TABLE 4

| Upper Surface | | Lower Surface | |
| --- | --- | --- | --- |
| x/c | y/c | x/c | y/c |
| 0.00003 | 0.00053 | 0.00009 | −0.00090 |
| 0.00038 | 0.00215 | 0.00069 | −0.00224 |
| 0.00226 | 0.00609 | 0.00179 | −0.00364 |
| 0.00956 | 0.01419 | 0.00481 | −0.00633 |
| 0.02173 | 0.02295 | 0.01546 | −0.01240 |
| 0.03860 | 0.03202 | 0.03146 | −0.01840 |
| 0.05999 | 0.04116 | 0.05264 | −0.02409 |
| 0.08569 | 0.05019 | 0.07880 | −0.02943 |
| 0.11542 | 0.05894 | 0.10964 | −0.03438 |
| 0.14886 | 0.06724 | 0.14480 | −0.03894 |
| 0.18564 | 0.07497 | 0.18387 | −0.04309 |
| 0.22536 | 0.08199 | 0.22636 | −0.04679 |
| 0.26758 | 0.08817 | 0.27176 | −0.05002 |
| 0.31183 | 0.09340 | 0.31952 | −0.05274 |
| 0.35762 | 0.09756 | 0.36907 | −0.05490 |
| 0.40444 | 0.10053 | 0.41982 | −0.05645 |
| 0.45176 | 0.10219 | 0.47117 | −0.05732 |
| 0.49904 | 0.10241 | 0.52253 | −0.05746 |
| 0.54576 | 0.10103 | 0.57329 | −0.05681 |
| 0.59134 | 0.09770 | 0.62288 | −0.05527 |
| 0.63573 | 0.09180 | 0.67072 | −0.05275 |
| 0.67954 | 0.08339 | 0.71627 | −0.04898 |
| 0.72289 | 0.07334 | 0.75939 | −0.04362 |
| 0.76532 | 0.06246 | 0.80026 | −0.03672 |
| 0.80626 | 0.05131 | 0.83903 | −0.02873 |
| 0.84507 | 0.04046 | 0.87561 | −0.02049 |
| 0.88101 | 0.03029 | 0.90947 | −0.01301 |
| 0.91342 | 0.02103 | 0.93959 | −0.00705 |
| 0.94187 | 0.01297 | 0.96481 | −0.00298 |
| 0.96579 | 0.00665 | 0.98395 | −0.00080 |
| 0.98420 | 0.00250 | 0.99592 | −0.00008 |
| 0.99595 | 0.00050 | 1.00000 | 0.00000 |
| 1.00000 | 0.00000 | | |

EXAMPLE V

Figure 10:
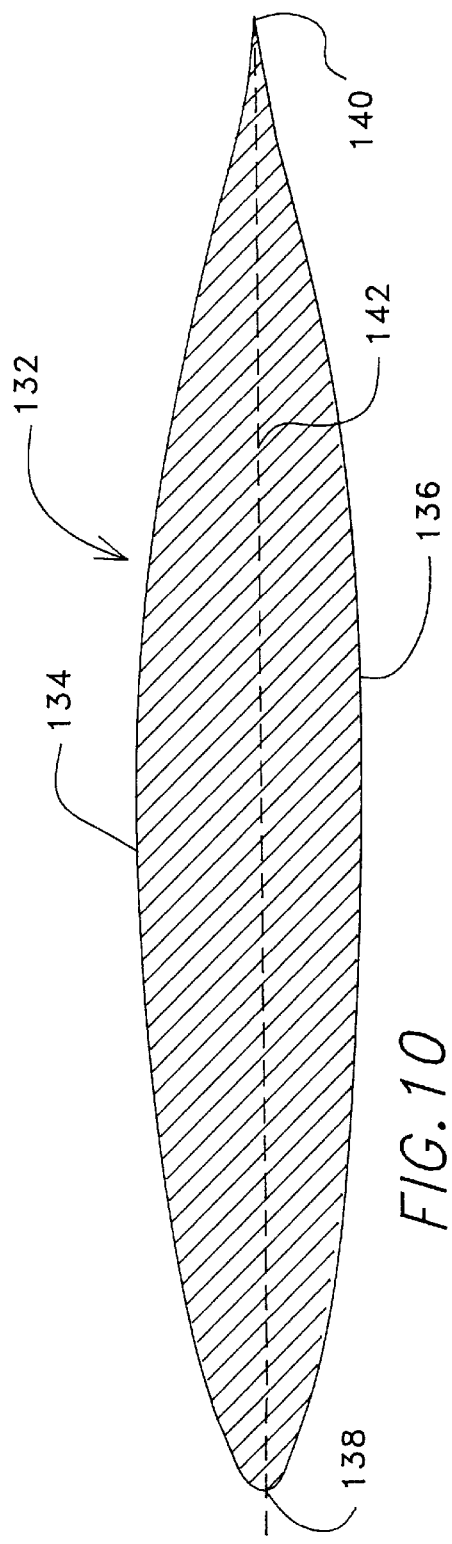
FIG. 10 is a cross-sectional view of a tip region showing still another airfoil that can be used in the horizontal axis wind turbine blades of FIG. 1.

A fifth example airfoil 132 designed in accordance with this invention is illustrated in FIG. 10, which shows an airfoil for the tip region 32 of a turbine blade 22. More specifically, the airfoil 132 illustrated in FIG. 10 is preferably located on a blade 22 at a distance away from the axis of rotation 26 that is approximately ninety-five percent (95%) of the length of the blade 22. The airfoil 132 has specific geometric tailoring to achieve a maximum lift coefficient of approximately 0.7 for a Reynolds number of approximately 2,000,000. The airfoil 132 includes the upper surface 134 and the lower surface 136 with the leading edge 138 and the trailing edge 140. The chord line 142 is formed between the leading edge 138 and the trailing edge 140. The airfoil 132 is designed for the tip region 32 of blades between ten and fifteen meters in length. The airfoil 132 also has a maximum thickness of approximately sixteen percent (16%) of the length of chord 142. Furthermore, while the airfoil 132 is designed for use primarily with a fixed pitch, stall-regulated, wind turbine, the airfoil 132 can also be used with variable pitch or variable speed wind turbines.

The specific shape or contour of the airfoil 132 is given in Table 5 in the form of dimensionless coordinates in the same manner as explained above for Example I. Briefly, the x/c values represent locations on the length c of the chord line 142 as in relation to the leading edge 138. The y/c values represent heights from the chord line 142 to points either on the upper surface 134 or the lower surface 136 of the airfoil 132. The x/c and y/c values are given for both the upper surface 134 and the lower surface 136 of the airfoil 132 in Table 5 in a similar manner as explained above for Table 1 in Example I.

TABLE 5

| Upper Surface | | Lower Surface | |
| --- | --- | --- | --- |
| x/c | y/c | x/c | y/c |
| 0.00013 | 0.00108 | 0.00002 | −0.00045 |
| 0.00067 | 0.00276 | 0.00044 | −0.00194 |
| 0.00489 | 0.00902 | 0.00134 | −0.00354 |
| 0.01452 | 0.01709 | 0.00212 | −0.00461 |
| 0.02906 | 0.02536 | 0.01005 | −0.01163 |
| 0.04837 | 0.03359 | 0.02315 | −0.01890 |
| 0.07229 | 0.04160 | 0.04127 | −0.02606 |
| 0.10057 | 0.04930 | 0.06425 | −0.03296 |
| 0.13289 | 0.05659 | 0.09185 | −0.03951 |
| 0.16888 | 0.06335 | 0.12378 | −0.04562 |
| 0.20815 | 0.06949 | 0.15967 | −0.05125 |
| 0.25023 | 0.07491 | 0.19913 | −0.05633 |
| 0.29466 | 0.07951 | 0.24170 | −0.06080 |
| 0.34092 | 0.08321 | 0.28689 | −0.06461 |
| 0.38849 | 0.08591 | 0.33419 | −0.06770 |
| 0.43683 | 0.08750 | 0.38303 | −0.07002 |
| 0.48538 | 0.08789 | 0.43287 | −0.07151 |
| 0.53360 | 0.08695 | 0.48311 | −0.07211 |
| 0.58093 | 0.08447 | 0.53320 | −0.07173 |
| 0.62698 | 0.08006 | 0.58256 | −0.07031 |
| 0.67187 | 0.07345 | 0.63061 | −0.06769 |
| 0.71580 | 0.06493 | 0.67694 | −0.06362 |
| 0.75874 | 0.05514 | 0.72141 | −0.05794 |
| 0.80038 | 0.04479 | 0.76401 | −0.05077 |
| 0.84011 | 0.03463 | 0.80466 | −0.04249 |
| 0.87719 | 0.02518 | 0.84317 | −0.03364 |
| 0.91085 | 0.01682 | 0.87913 | −0.02486 |
| 0.94045 | 0.00986 | 0.91199 | −0.01676 |
| 0.96518 | 0.00473 | 0.94106 | −0.00992 |
| 0.98404 | 0.00161 | 0.96546 | −0.00480 |
| 0.99593 | 0.00028 | 0.98414 | −0.00166 |
| 1.00000 | 0.00000 | 0.99595 | −0.00029 |
| | | 1.00000 | 0.00000 |

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow.

The embodiments of the invention in which an exclusive property or privilege is claimed are defined as follows:

1. An airfoil, comprising:
   a leading edge;
   a trailing edge spaced apart from said leading edge;
   an upper surface extending from said leading edge to said trailing edge;
   a lower surface extending from said leading edge to said trailing edge; and
   said airfoil having a shape characterized by a thickness of about seventeen percent, a Reynolds number of about 2,000,000, and a maximum lift coefficient in a range of about 1.4 to 1.5.

2. An airfoil for a tip region of a blade of a wind turbine wherein said airfoil has a thickness in the range of about fourteen percent to sixteen percent, a maximum lift coefficient of about 0.7, and a Reynolds number in a range of about 1,500,000 to 3,000,000.

3. An airfoil, comprising:
   a leading edge;
   a trailing edge spaced apart from said leading edge;
   an upper surface extending from said leading edge to said trailing edge;
   a lower surface extending from said leading edge to said trailing edge; and
   said airfoil having a cross-section shape characterized by a thickness of about sixteen percent, a Reynolds number of about 2.000,000, and a maximum lift coefficient of about 0.7.

4. A wind turbine that is rotatable about a horizontal axis, said wind turbine comprising:
   at least one blade mounted for rotation about said horizontal axis and extending a distance radially outward from the horizontal axis to a tip, said blade comprising a tip region extending from a point that is approximately ninety-five percent of the distance radially outward from the horizontal axis to the tip; and
   at least one airfoil in said tip region, said airfoil having a thickness in a range of about fourteen percent to sixteen percent, a Reynolds number in a range of about 1,500,000 to 2,000,000, and a maximum lift coefficient in a range of about 1.4 to 1.5.

5. The wind turbine of claim 4, wherein said airfoil has a thickness of approximately fourteen percent.

6. The wind turbine of claim 4, wherein said airfoil has a thickness of approximately 16 percent.

7. A wind turbine that is rotatable about a horizontal axis, said wind turbine comprising:
   at least one blade mounted for rotation about said horizontal axis and extending a distance radially outward from the horizontal axis to a tip, said blade comprising a mid-span region extending from a point that is approximately fifty percent of the distance radially outward from the horizontal axis to a point that is approximately ninety-five percent of the distance radially outward from the horizontal axis; and
   at least one airfoil in said mid-span region, said airfoil having a thickness in a range of about seventeen percent to twenty-one percent, a Reynolds number in a range of about 1,500,000 to about 2,500,000, and a maximum lift coefficient of about 1.4 to about 1.5.

8. The wind turbine of claim 7, wherein said airfoil has a thickness of approximately seventeen percent.

9. A tip region airfoil of a turbine blade, said airfoil comprising:
   an upper surface and a lower surface, both of which extend spaced-apart in relation to each other from a leading edge to a trailing edge; and
   a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface and on the lower surface substantially as follows:

| Upper Surface | | Lower Surface | |
| --- | --- | --- | --- |
| x/c | y/c | x/c | y/c |
| 0.00001 | 0.00030 | 0.00014 | −0.00143 |
| 0.00028 | 0.00224 | 0.00081 | −0.00307 |
| 0.00129 | 0.00543 | 0.00197 | −0.00477 |
| 0.00721 | 0.01481 | 0.00650 | −0.00920 |
| 0.01766 | 0.02500 | 0.01819 | −0.01650 |
| 0.03250 | 0.03549 | 0.03502 | −0.02381 |
| 0.05161 | 0.04596 | 0.05670 | −0.03093 |
| 0.07479 | 0.05616 | 0.08297 | −0.03780 |
| 0.10185 | 0.06588 | 0.11351 | −0.04443 |
| 0.13251 | 0.07494 | 0.14790 | −0.05114 |
| 0.16643 | 0.08315 | 0.18480 | −0.05834 |
| 0.20324 | 0.09032 | 0.22231 | −0.06499 |
| 0.24253 | 0.09625 | 0.25997 | −0.06891 |
| 0.28387 | 0.10060 | 0.29879 | −0.06869 |
| 0.32709 | 0.10296 | 0.34011 | −0.06415 |
| 0.37230 | 0.10329 | 0.38475 | −0.05600 |
| 0.41930 | 0.10195 | 0.43307 | −0.04520 |
| 0.46763 | 0.09920 | 0.48499 | −0.03306 |
| 0.51676 | 0.09525 | 0.53974 | −0.02082 |
| 0.56616 | 0.09029 | 0.59631 | −0.00935 |
| 0.61526 | 0.08450 | 0.65355 | 0.00060 |
| 0.66350 | 0.07806 | 0.71026 | 0.00854 |
| 0.71028 | 0.07112 | 0.76514 | 0.01410 |
| 0.75503 | 0.06385 | 0.81692 | 0.01713 |
| 0.79720 | 0.05636 | 0.86437 | 0.01757 |
| 0.83624 | 0.04878 | 0.90608 | 0.01553 |
| 0.87165 | 0.04117 | 0.94062 | 0.01168 |
| 0.90294 | 0.03351 | 0.96717 | 0.00727 |
| 0.92994 | 0.02560 | 0.98566 | 0.00342 |
| 0.95294 | 0.01758 | 0.99646 | 0.00088 |
| 0.97208 | 0.01022 | 1.00000 | 0.00000 |
| 0.98695 | 0.00450 | | |
| 0.99661 | 0.00108 | | |
| 1.00000 | 0.00000 | | |

10. The airfoil of claim 9, wherein said blade has a length in a range of about ten to fifteen meters.

11. A mid-span region airfoil of a turbine blade, said airfoil comprising:
   an upper surface and a lower surface, both of which extend spaced-apart in relation to each other from a leading edge to a trailing edge;
   a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface and on the lower surface substantially as follows:

| Upper Surface | | Lower Surface | |
|---|---|---|---|
| x/c | y/c | x/c | y/c |
| 0.00018 | 0.00159 | 0.00000 | −0.00005 |
| 0.00255 | 0.00748 | 0.00021 | −0.00146 |
| 0.00954 | 0.01638 | 0.00093 | −0.00274 |
| 0.02088 | 0.02596 | 0.00216 | −0.00403 |
| 0.03651 | 0.03580 | 0.00367 | −0.00525 |
| 0.05636 | 0.04562 | 0.01367 | −0.01035 |
| 0.08026 | 0.05519 | 0.02920 | −0.01518 |
| 0.10801 | 0.06434 | 0.04998 | −0.01960 |
| 0.13934 | 0.07288 | 0.07580 | −0.02362 |
| 0.17395 | 0.08068 | 0.10637 | −0.02729 |
| 0.21146 | 0.08758 | 0.14133 | −0.03901 |
| 0.25149 | 0.09343 | 0.17965 | −0.03486 |
| 0.29361 | 0.09807 | 0.21987 | −0.03855 |
| 0.33736 | 0.10133 | 0.26153 | −0.04064 |
| 0.38228 | 0.10294 | 0.30497 | −0.04051 |
| 0.42820 | 0.10249 | 0.35027 | −0.03794 |
| 0.47526 | 0.10005 | 0.39779 | −0.03280 |
| 0.52324 | 0.09607 | 0.44785 | −0.02563 |
| 0.57161 | 0.09094 | 0.50032 | −0.01720 |
| 0.61980 | 0.08489 | 0.55484 | −0.00841 |
| 0.66724 | 0.07816 | 0.61055 | −0.00015 |
| 0.71333 | 0.07095 | 0.66644 | 0.00699 |
| 0.75749 | 0.06341 | 0.72142 | 0.01254 |
| 0.79915 | 0.05572 | 0.77434 | 0.01621 |
| 0.83778 | 0.04798 | 0.82409 | 0.01784 |
| 0.87287 | 0.04029 | 0.86953 | 0.01741 |
| 0.90391 | 0.03262 | 0.90945 | 0.01498 |
| 0.93072 | 0.02479 | 0.94257 | 0.01113 |
| 0.95355 | 0.01695 | 0.96813 | 0.00689 |
| 0.97251 | 0.00982 | 0.98604 | 0.00324 |
| 0.98719 | 0.00431 | 0.99655 | 0.00084 |
| 0.99668 | 0.00103 | 1.00000 | 0.00000 |
| 1.00000 | 0.00000 | | |

12. The airfoil of claim 11, wherein said blade has a length in a range of about ten to fifteen meters.

13. A mid-span region airfoil of a turbine blade, said airfoil comprising:

an upper surface and a lower surface, both of which extend spaced-apart in relation to each other from a leading edge to a trailing edge; and a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface or on the lower surface substantially as follows:

| Upper Surface | | Lower Surface | |
|---|---|---|---|
| x/c | y/c | x/c | y/c |
| 0.00000 | 0.00054 | 0.00010 | −0.00098 |
| 0.00040 | 0.00228 | 0.00075 | −0.00240 |
| 0.00327 | 0.00789 | 0.00194 | −0.00390 |
| 0.01168 | 0.01688 | 0.00388 | −0.00572 |
| 0.02501 | 0.02661 | 0.01440 | −0.01227 |
| 0.04304 | 0.03671 | 0.03068 | −0.01907 |
| 0.06557 | 0.04692 | 0.05249 | −0.02597 |
| 0.09234 | 0.05703 | 0.07952 | −0.03303 |
| 0.12305 | 0.06686 | 0.11138 | −0.04031 |
| 0.15735 | 0.07623 | 0.14752 | −0.04794 |
| 0.19486 | 0.08497 | 0.18727 | −0.05596 |
| 0.23516 | 0.09293 | 0.22978 | −0.06438 |
| 0.27779 | 0.09996 | 0.27409 | −0.07310 |
| 0.32229 | 0.10593 | 0.31892 | −0.08183 |
| 0.36815 | 0.11068 | 0.36288 | −0.08933 |
| 0.41487 | 0.11409 | 0.40597 | −0.09376 |
| 0.46193 | 0.11603 | 0.44906 | −0.09443 |
| 0.50881 | 0.11636 | 0.49274 | −0.09126 |
| 0.55498 | 0.11490 | 0.53770 | −0.08456 |
| 0.59988 | 0.11131 | 0.58417 | −0.07538 |
| 0.64347 | 0.10497 | 0.63172 | −0.06463 |
| 0.68639 | 0.09591 | 0.67984 | −0.05305 |
| 0.72880 | 0.08503 | 0.72787 | −0.04136 |
| 0.77025 | 0.07315 | 0.77506 | −0.03025 |
| 0.81021 | 0.06086 | 0.82049 | −0.02035 |
| 0.84805 | 0.04872 | 0.86316 | −0.01216 |
| 0.88305 | 0.03718 | 0.90192 | −0.00603 |
| 0.91460 | 0.02643 | 0.93560 | −0.00204 |
| 0.94236 | 0.01682 | 0.96306 | −0.00001 |
| 0.96586 | 0.00900 | 0.98337 | 0.00052 |
| 0.98413 | 0.00360 | 0.99581 | 0.00025 |
| 0.99591 | 0.00078 | 1.00000 | 0.00000 |
| 1.00000 | 0.00000 | | |

14. The airfoil of claim 13, wherein said blade has a length in a range of about fifteen to twenty-five meters.

15. A tip region airfoil of a turbine blade, said airfoil comprising:

an upper surface and a lower surface, both of which extend spaced-apart in relation to each other from a leading edge to a trailing edge; and a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface and the lower surface substantially as follows:

| Upper Surface | | Lower Surface | |
|---|---|---|---|
| x/c | y/c | x/c | y/c |
| 0.00003 | 0.00053 | 0.00009 | −0.00090 |
| 0.00038 | 0.00215 | 0.00069 | −0.00224 |
| 0.00226 | 0.00609 | 0.00179 | −0.00364 |
| 0.00956 | 0.01419 | 0.00481 | −0.00633 |
| 0.02173 | 0.02295 | 0.01546 | −0.01240 |
| 0.03860 | 0.03202 | 0.03146 | −0.01840 |
| 0.05999 | 0.04116 | 0.05264 | −0.02409 |
| 0.08569 | 0.05019 | 0.07880 | −0.02943 |
| 0.11542 | 0.05894 | 0.10964 | −0.03438 |
| 0.14886 | 0.06724 | 0.14480 | −0.03894 |
| 0.18564 | 0.07497 | 0.18387 | −0.04309 |
| 0.22536 | 0.08199 | 0.22636 | −0.04679 |
| 0.26758 | 0.08817 | 0.27176 | −0.05002 |
| 0.31183 | 0.09340 | 0.31952 | −0.05274 |
| 0.35762 | 0.09756 | 0.36907 | −0.05490 |
| 0.40444 | 0.10053 | 0.41982 | −0.05645 |
| 0.45176 | 0.10219 | 0.47117 | 0.05732 |
| 0.49904 | 0.10241 | 0.52253 | −0.05746 |
| 0.54576 | 0.10103 | 0.57329 | −0.05681 |
| 0.59134 | 0.09770 | 0.62288 | −0.05527 |
| 0.63573 | 0.09180 | 0.67072 | −0.05275 |
| 0.67954 | 0.08339 | 0.71627 | −0.04898 |

-continued

| Upper Surface | | Lower Surface | |
|---|---|---|---|
| x/c | y/c | x/c | y/c |
| 0.72289 | 0.07334 | 0.75939 | −0.04362 |
| 0.76532 | 0.06246 | 0.80026 | −0.03672 |
| 0.80626 | 0.05131 | 0.83903 | −0.02873 |
| 0.84507 | 0.04046 | 0.87561 | −0.02049 |
| 0.88101 | 0.03029 | 0.90947 | −0.01301 |
| 0.91342 | 0.02103 | 0.93959 | −0.00705 |
| 0.94187 | 0.01297 | 0.96481 | −0.00298 |
| 0.96579 | 0.00665 | 0.98395 | −0.00080 |
| 0.98420 | 0.00250 | 0.99592 | −0.00008 |
| 0.99595 | 0.00050 | 1.00000 | 0.00000 |
| 1.00000 | 0.00000 | | |

16. The airfoil of claim 15, wherein said blade has a length in a range of about fifteen to twenty-five meters.

17. A tip region airfoil of a turbine blade, said airfoil comprising:

an upper surface and a lower surface, both of which extend spaced-apart in relation to each other from a leading edge to a trailing edge;

a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface and on the lower surface substantially as follows:

| Upper Surface | | Lower Surface | |
|---|---|---|---|
| x/c | y/c | x/c | y/c |
| 0.00013 | 0.00108 | 0.00002 | −0.00045 |
| 0.00067 | 0.00276 | 0.00044 | −0.00194 |
| 0.00489 | 0.00902 | 0.00134 | −0.00354 |
| 0.01452 | 0.01709 | 0.00212 | −0.00461 |
| 0.02906 | 0.02536 | 0.01005 | −0.01163 |
| 0.04837 | 0.03359 | 0.02315 | −0.01890 |
| 0.07229 | 0.04160 | 0.04127 | −0.02606 |
| 0.10057 | 0.04930 | 0.06425 | −0.03296 |
| 0.13289 | 0.05659 | 0.09185 | −0.03951 |
| 0.16888 | 0.06335 | 0.12378 | −0.04562 |

-continued

| Upper Surface | | Lower Surface | |
|---|---|---|---|
| x/c | y/c | x/c | y/c |
| 0.20815 | 0.06949 | 0.15967 | −0.05125 |
| 0.25023 | 0.07491 | 0.19913 | −0.05633 |
| 0.29466 | 0.07951 | 0.24170 | −0.06080 |
| 0.34092 | 0.08321 | 0.28689 | −0.06461 |
| 0.38849 | 0.08591 | 0.33419 | −0.06770 |
| 0.43683 | 0.08750 | 0.38303 | −0.07002 |
| 0.48538 | 0.08789 | 0.43287 | −0.07151 |
| 0.53360 | 0.08695 | 0.48311 | −0.07211 |
| 0.58093 | 0.08447 | 0.53320 | −0.07173 |
| 0.62698 | 0.08006 | 0.58256 | −0.07031 |
| 0.67187 | 0.07345 | 0.63061 | −0.06769 |
| 0.71580 | 0.06493 | 0.67694 | −0.06362 |
| 0.75874 | 0.05514 | 0.72141 | −0.05794 |
| 0.80038 | 0.04479 | 0.76401 | −0.05077 |
| 0.84011 | 0.03463 | 0.80466 | −0.04249 |
| 0.87719 | 0.02518 | 0.84317 | −0.03364 |
| 0.91085 | 0.01682 | 0.87913 | −0.02486 |
| 0.94045 | 0.00986 | 0.91199 | −0.01676 |
| 0.96518 | 0.00473 | 0.94106 | −0.00992 |
| 0.98404 | 0.00161 | 0.96546 | −0.00480 |
| 0.99593 | 0.00028 | 0.98414 | −0.00166 |
| 1.00000 | 0.00000 | 0.99595 | −0.00029 |
| | | 1.00000 | 0.00000 |

18. The airfoil of claim 17, wherein said blade has a length in a range of about fifteen to twenty-five meters.

19. A wind turbine that is rotatable about a horizontal axis, said wind turbine comprising:

at least one blade mounted for rotation about said horizontal axis and extending a distance radially outward from the horizontal axis to a tip, said blade comprising a tip region extending from a point that is approximately ninety-five percent of the distance radially outward from the horizontal axis to the tip; and at least one airfoil in said tip region, said airfoil having a thickness in a range of about fourteen percent to sixteen percent, a Reynolds number in a range of about 1,500,000 to 3,000,000, and a maximum lift coefficient of about 0.7.

20. The wind turbine of claim 19, wherein said airfoil has a thickness of approximately sixteen percent and a Reynolds number of approximately 2,000,000.

\* \* \* \* \*